B. G. PATTERSON.
NUT LOCK.
APPLICATION FILED APR. 5, 1917.

1,260,569.

Patented Mar. 26, 1918.

WITNESSES

INVENTOR
BENJAMIN G. PATTERSON,
BY
ATTORNEYS

UNITED STATES PATENT OFFICE.

BENJAMIN G. PATTERSON, OF OKLAHOMA, OKLAHOMA.

NUT-LOCK.

1,260,569.  Specification of Letters Patent.  Patented Mar. 26, 1918.

Application filed April 5, 1917. Serial No. 159,912.

*To all whom it may concern:*

Be it known that I, BENJAMIN G. PATTERSON, a citizen of the United States, and a resident of Oklahoma city, in the county of Oklahoma and State of Oklahoma, have invented a certain new and useful Improvement in Nut-Locks, of which the following is a specification.

My present invention relates generally to nut locks, and more particularly to that type of nut lock including nut carried locking means in the form of a movable element for engaging with a portion of the threads of the bolt to securely lock the nut against rotation in one direction, at the same time permitting the nut to freely move upon the bolt in the opposite direction.

My invention is directed to and includes the particular construction of the parts adjacent to the locking element, including the particular formation of the nut for the reception of said element, whereby a nut lock of this type having maximum efficiency in use may, at the same time, be formed in an inexpensive manner as to its several parts, and quickly and effectively assembled for use.

In the accompanying drawing which illustrates the construction forming the basis of my present invention:

Figure 1:
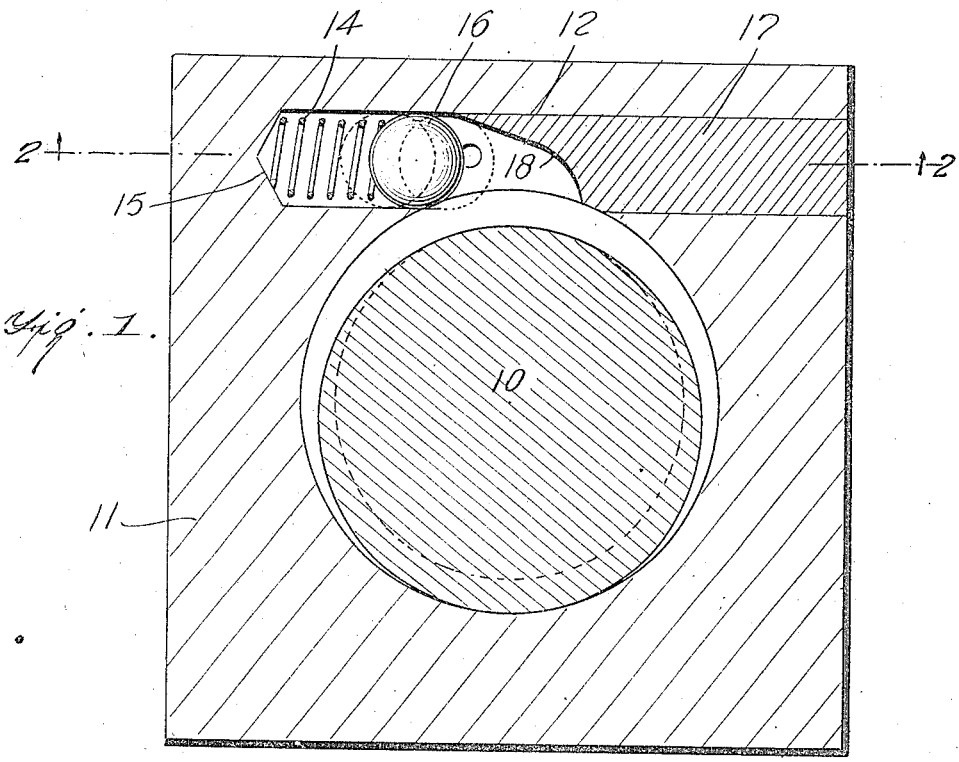
Figure 1 is a vertical sectional view taken transversely through a bolt with the nut thereon, the latter and its parts formed in accordance with my invention, and taken substantially on line 1—1 of Fig. 2.
Figure 2:
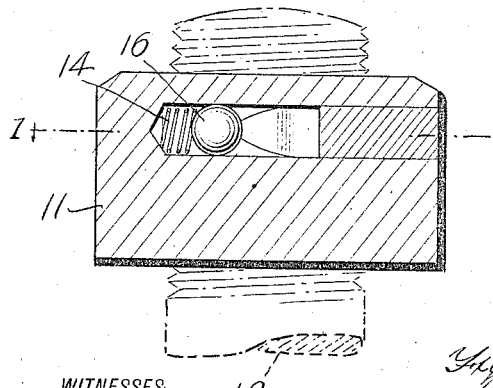
Fig. 2 is a sectional view taken on line 2—2 of Fig. 1, looking in the direction of the arrows.

Referring now to these figures, and particularly to Fig. 1, the bolt is indicated at 10 and a nut thereon at 11, the latter of which being provided in accordance with my invention with a bore 12 drilled therein from one of its sides, parallel to another side as well as the opposite faces of the nut and for the major portion of the width of the nut, the inner end of this drilled bore terminating short of the opposite side of the nut. This bore furthermore extends at right angles to the axis of the bolt 10 and the threaded bolt opening of the nut 11, and partially intersects the bolt opening of the nut so that when screwed upon the bolt the hip of one of the bolt threads will project into the bore 12, as clearly seen by reference to Fig. 3, and as indicated at 13 in said figure.

Into the bore 12 which, due to its particular location and arrangement, may be formed by a simple drilling operation, is extended a coiled spring 14 which finds bearing at the inner end 15 of the bore, and against this spring is disposed a movable spherical threaded gripping member 16 which moves toward the inner end of the bore and against the tension of spring 14 when the nut is screwed upon the bolt 10.

Into the outer end of the bore 12 is extended a plug 17, the inner end of which projects to a point approximately centrally of the length of the bore, and is beveled and concaved to form an abutment for engagement by the gripping member 16 whereby to move the latter inwardly into snug engagement with the projecting portion of the bolt threads upon any tendency of the nut to turn in the opposite direction.

In this way the plug 17 may be readily secured in place without the use of threads or other fastening members, inasmuch as there is ordinarily no strain thrown longitudinally against the ball 16 and its spring 14 for bearing against the inner solid end of the bore. When the nut is screwed tight upon the bolt, the spring 14 forces the ball 16 into tight engagement with the projecting portion 13 of the bolt threads so that upon any tendency of the nut to turn in the opposite direction and loosen upon the bolt, the ball 16 will be forced by friction against the inner beveled and concaved end of the plug 17 which will force the ball toward the bolt and thus into gripping engagement with the projecting portion of the bolt thread of gradually increasing power.

It is apparent that, by the particular arrangement and disposition of the parts as well as their particular construction, the plug 17 closes the outer end of the bore formed in the nut for the introduction of the gripping member in the first instance, and in addition thereto constitutes an abutment for the purpose mentioned, the construction avoiding the complicated and expensive slotting of the nut or threading or other operations of like nature within the bore in which the locking element operates, and my invention thus provides a construction which for these reasons will be inexpensive and which, by virtue of the actual shifting of the locking element toward the bolt will be highly effective and efficient in use for the purpose stated.

Figure 3:
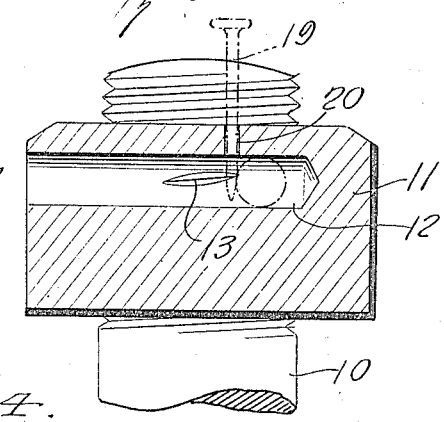
Fig. 3 is a section taken on the same line looking in the opposite direction, with the locking elements removed.
Figure 4:
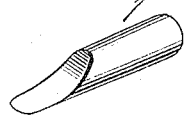
Fig. 4 is a detail perspective view of the plug.

It is to be observed that this construction also avoids the extension of any part or parts beyond the sides of the nut which in other constructions of a somewhat similar nature interfere with the application of a wrench or other tool to the nut for tightening the same or removing it from secured position, the ball being capable of release from its locked position in engagement with the bolt threads by the use of a suitable tool 19, as seen in Fig. 3, for the reception of which the nut 11 is provided with an opening 20 extending inwardly from one face thereof at right angles to the bore 12 and communicating with the latter at a point adjacent the inner end 18 of the plug 17, so that the inner end of the tool 19 may be utilized to press the ball 16 laterally out of binding engagement with the bolt thread.

I claim:

1. A nut lock comprising the combination of a bolt and nut, the latter of which is provided with a bore of uniform diameter throughout extending from one side partially therethrough and terminating short of the opposite side, said bore being arranged parallel of the faces of the nut and partially intersecting the bolt opening of the nut to receive a portion of the bolt threads therein, a spring at the inner end of the said bore, a thread gripping ball disposed against the said spring, and a plug secured within the outer end of the bore and having its inner end extending adjacent the point of intersection of the bore and the bolt opening and beveled to form an abutment for the ball adapted to force the latter into engagement with the bolt when the nut is turned on the bolt in one direction.

2. A nut lock comprising the combination of a bolt and nut, the latter of which is provided with a bore of uniform diameter throughout, extending from one side partially therethrough and terminating short of the opposite side, said bore being arranged parallel of the faces of the nut and partially intersecting the bolt opening of the nut to receive a portion of the bolt threads therein, a spring at the inner end of the said bore, a thread gripping ball disposed against the said spring, and a plug secured within the outer end of the bore and having its inner end extending adjacent the point of intersection of the bore and the bolt opening and beveled to form an abutment for the ball adapted to force the latter into engagement with the bolt when the nut is turned on the bolt in one direction, and said nut having an opening extending inwardly from one face thereof at right angles to its bore and communicating at its inner end with the bore at a point adjacent the inner end of the plug, for the purpose described.

BENJAMIN G. PATTERSON.